Jan. 13, 1970    E. S. KRACKOW    3,489,882
SWITCH SEQUENCE CONTROL FOR HEATING ELEMENTS AND THE LIKE
Filed April 5, 1968    3 Sheets-Sheet 2

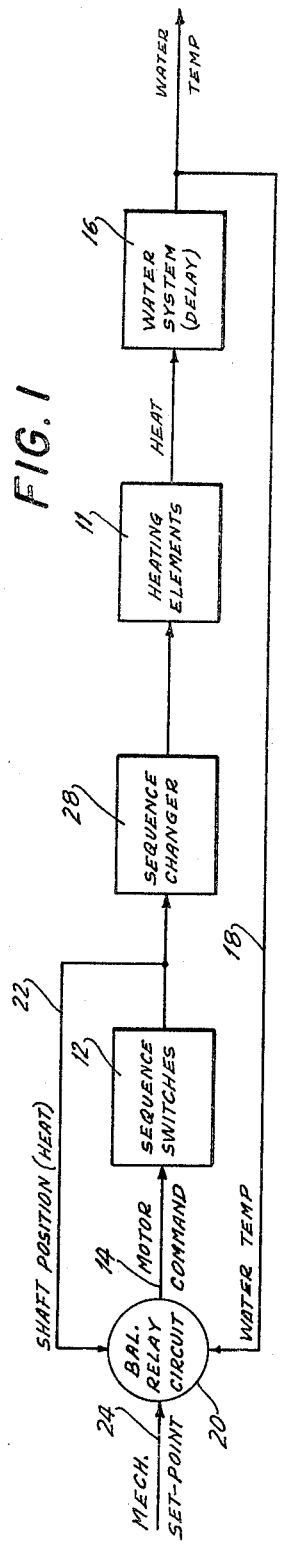
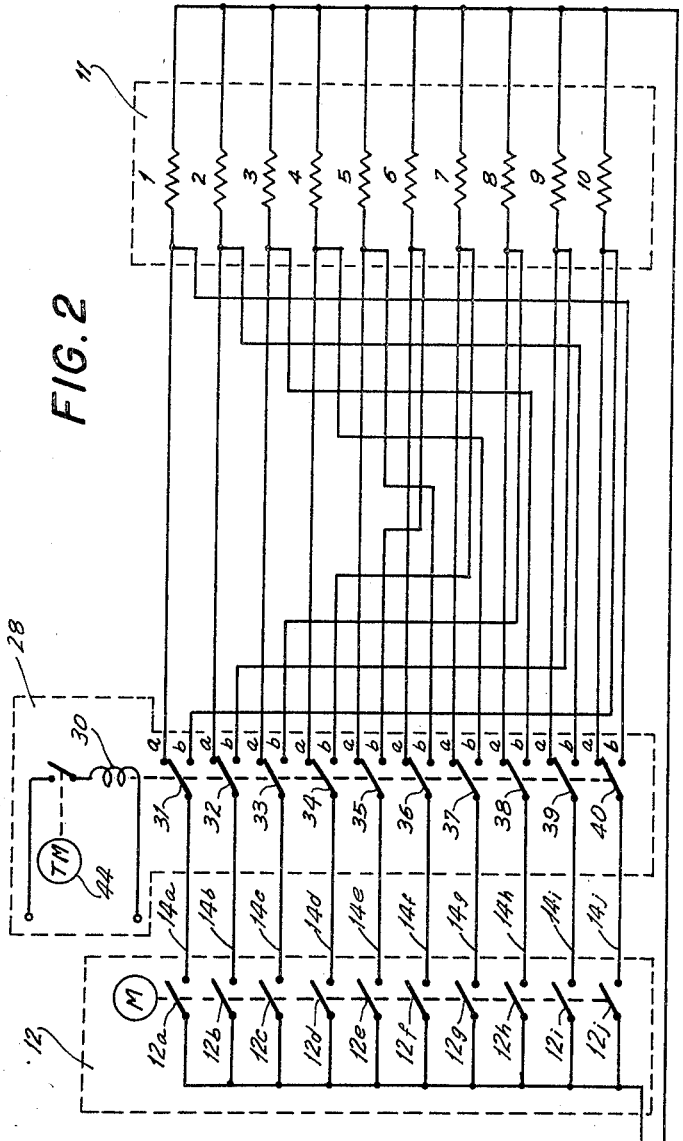

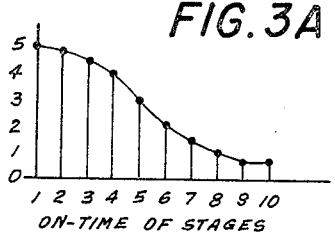
FIG.3A
ON-TIME OF STAGES

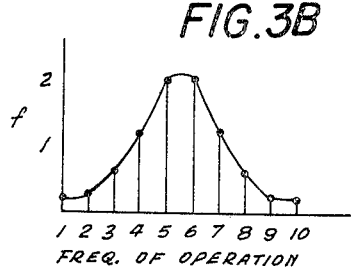
FIG.3B
FREQ. OF OPERATION

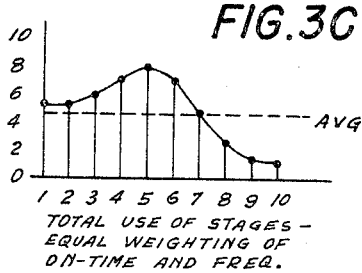
FIG.3C
TOTAL USE OF STAGES -
EQUAL WEIGHTING OF
ON-TIME AND FREQ.

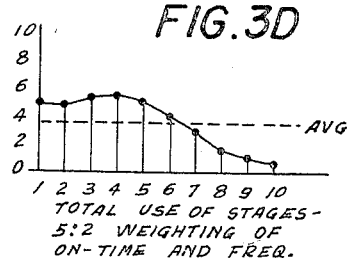
FIG.3D
TOTAL USE OF STAGES -
5:2 WEIGHTING OF
ON-TIME AND FREQ.

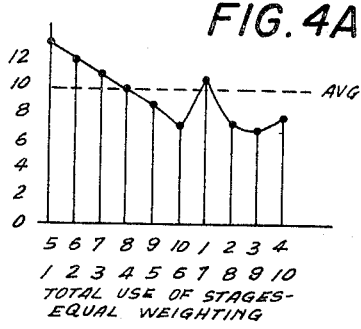
FIG.4A
5 6 7 8 9 10 1 2 3 4
1 2 3 4 5 6 7 8 9 10
TOTAL USE OF STAGES -
EQUAL WEIGHTING

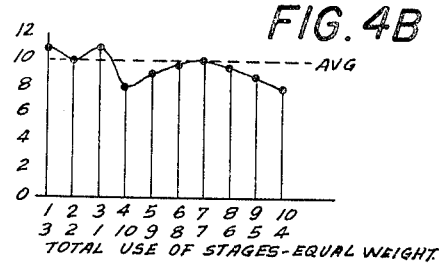
FIG.4B
1 2 3 4 5 6 7 8 9 10
3 2 1 10 9 8 7 6 5 4
TOTAL USE OF STAGES - EQUAL WEIGHT.

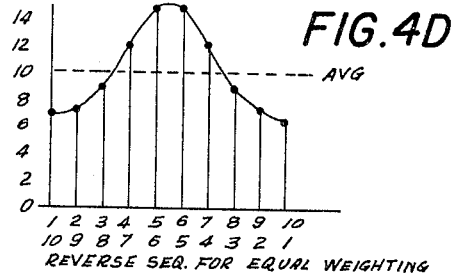
FIG.4D
1 2 3 4 5 6 7 8 9 10
10 9 8 7 6 5 4 3 2 1
REVERSE SEQ. FOR EQUAL WEIGHTING

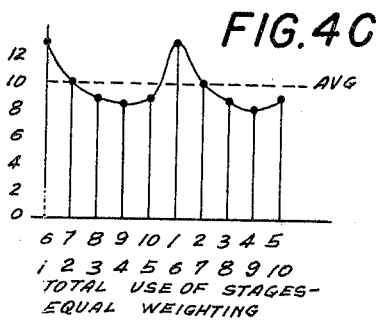
FIG.4C
6 7 8 9 10 1 2 3 4 5
1 2 3 4 5 6 7 8 9 10
TOTAL USE OF STAGES -
EQUAL WEIGHTING

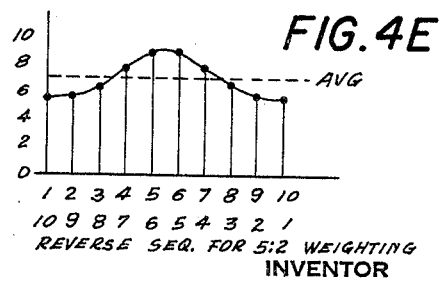
FIG.4E
1 2 3 4 5 6 7 8 9 10
10 9 8 7 6 5 4 3 2 1
REVERSE SEQ. FOR 5:2 WEIGHTING

INVENTOR
ERIC S. KRACKOW
BY
ATTORNEY

Jan. 13, 1970   E. S. KRACKOW   3,489,882
SWITCH SEQUENCE CONTROL FOR HEATING ELEMENTS AND THE LIKE
Filed April 5, 1968                            3 Sheets-Sheet 3
FIG. 5A
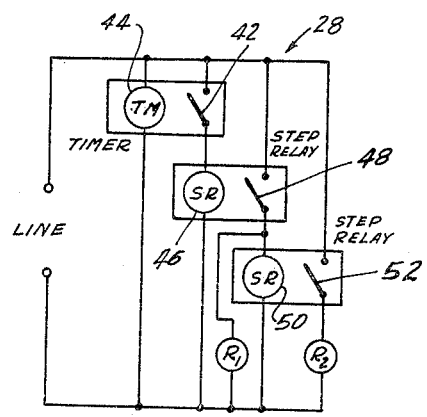
FIG. 5B
| TIMER OPS | $R_1$ | $R_2$ |
|---|---|---|
| 0 | 0 | 0 |
| 1 | X | X |
| 2 | 0 | X |
| 3 | X | 0 |
| 4 | 0 | 0 |
FIG. 6A
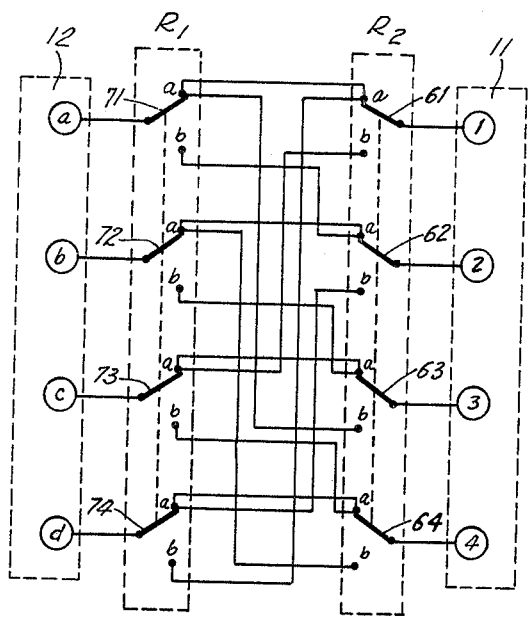
FIG. 6B
CONTACTOR SEQUENCE
| 0 0 | X O | O X | X X |
|---|---|---|---|
| 1 | 2 | 3 | 4 |
| 2 | 3 | 4 | 1 |
| 3 | 4 | 1 | 2 |
| 4 | 1 | 2 | 3 |
INVENTOR
ERIC S. KRACKOW
BY
ATTORNEY United States Patent Office 3,489,882
Patented Jan. 13, 1970

3,489,882
SWITCH SEQUENCE CONTROL FOR HEATING
ELEMENTS AND THE LIKE
Eric S. Krackow, Flushing, N.Y., assignor to Automatic
Steam Products Corporation, New York, N.Y., a corporation of New York
Filed Apr. 5, 1968, Ser. No. 719,275
Int. Cl. H05b 1/02
U.S. Cl. 219—486          18 Claims

ABSTRACT OF THE DISCLOSURE

A sequence changing system is interposed between the sequence control system and a plurality of work elements of a heating system. The sequence changing system is periodically actuated to alter the operating sequence of the load elements. As a result, the average period of use of each of the load elements is substantially equalized, thereby to increase the overall reliability of the system.

BACKGROUND OF THE INVENTION

This invention relates to control systems and in particular to a sequentially operated control system in which a plurality of work elements are energized in a predetermined plurality of sequences to establish and maintain a desired load condition.

Systems, such as heating systems, generally comprise a plurality of individual work elements a predetermined number of which are energized at a given time to provide the desired output. While in the body of this specification, reference will be made to heating systems, it will be understood that the present invention is equally applicable to cooling and pressure control systems, and to other systems in which an output condition is set and maintained at a desired value.

In conventional heating systems, a plurality of electrical heating elements are arranged in operative connection with sequencer in which a plurality of switches are opened and closed to match the electrical heating element input to the system heat losses, thereby to maintain a substantially constant load condition. Each of the sequencer switches is operatively connected to one of the heating elements and is effective to energize or deenergize the heating elements in successive discrete steps in response to the operation of the sequencer. In order to maintain the load temperature at a desired value, it is continuously monitored and a signal corresponding thereto is fed back to the input control system where it is compared to the desired temperature condition. If the load condition deviates from this desired value, a signal is developed at the input control which is operatively coupled to the sequencer to cause the required number of sequence control switches to open or close, thereby energizing or deenergizing the appropriate number of heating elements. When the load temperature exceeds the desired temperature the sequencer will effectively remove or deenergize one or more load elements, and when the load temperature is below the desired level, the sequencer will operate to energize a sufficient number of heating elements to raise the load temperature to its desired level.

The operative connection between the sequencer and the heating elements is such that the heating elements are always energized or deenergized in a set sequence, that is, one heating element is always the first to be operated, followed by the successive operation of the succeeding heating elements in order. If the heating elements were assigned the numerals 1–10, and the load is operated at one half the total capacity of the heating elements, the first group of heating elements (numbered 1–5) are energized in sequence and remain energized to establish the desired load condition. The remaining heating elements 6–10 will remain unenergized. If the load temperature varies from the desired condition, the sequencer would be caused to operate to deactuate heating elements 5 and 4, or to actuate heating elements 6 and 7, as needed to tend to reestablish the desired load temperature. It will thus be appreciated that the first group of heating elements will be energized substantially for all periods of operation, and are rarely switched off or deenergized to compensate for variations in the load condition. Correspondingly, the last of the heating elements to be energized in normal sequential operation, that is the elements 8, 9, and 10, are rarely energized to provide a desired increase in the load temperature. The latter heating elements need only be energized when maximum heat must be supplied.

It will thus be seen that the early heating elements are energized almost all of the time that the load is being heated, and the later heating elements are energized for only relatively brief periods of time, if at all. In applications where maximum heat supply is rarely required, the later heating elements may not be energized for periods lasting for weeks or even months.

As a result of the uneven utilization of the heating elements, those elements which are utilized to the greatest extent will tend to fail at a rate far greater than that for those elements which are rarely, if ever, used.

In some instances the individual switches for the heating elements may be adversely affected by the frequency with which they are opened and closed. In such instances, the switching contacts for the middle heating elements will be most likely to fail, since they are the contacts most often opened and closed in temperature control.

If a composite work cycle were considered for each of the load heating elements, based on an equal weighting of period of use and frequency of switching, the most severe work cycle would be found for the heating elements in the beginning and the middle of the operating sequence, while the work cycle of those elements at the end of the switching sequence would be substantially less severe. This factor is applicable in some work systems, but not all. Often, it has been found, the rate of heating element failure depends mainly on the length of time that the element is used. In such systems the unequal frequency of switching of the associated contacts, while contributing to the unequal failure rates, has been found to be of secondary significance.

What ever the characteristics of a given system, the rate of failure of some heating elements will tend to be far greater than the corresponding rate of failure of others. When one of the heating elements or its associated switch contacts fails, the overall operation of the heating system becomes unreliable and inaccurate, thus often requiring a complete shutdown of the boiler system so that the faulty heating element may be located and replaced with a new element. In boiler heating systems, such as those used in manufacturing plants and commercial and residential buildings, even a relatively short period of boiler shutdown will produce great inconvenience, loss of valuable work time, and a substantial waste of money and loss of profits. It is thus of great importance in the design and operation of boiler heating systems and the like, that reliable operation be insured for the greatest period of time and that the interval between breakdowns be extended as far as possible, i.e. that the rate of failure of the individual heating elements be decreased as much as possible.

It is, therefore, a general object of the present invention to provide a control system in which the rate of failure of work elements is substantially reduced.

It is a further object of the present invention to provide a sequence control system for use with a pluraltiy of load elements wherein the overall duty cycle for each of the elements is substantially equalized, whether, and to whatever extent, that duty cycle is affected by duration of use, frequency of switching, or other operating conditions.

It is yet a further object of this invention to provide a control system in which greatly increased reliability is achieved by the addition of relatively simple and inexpensive sequence changing control elements into the load control system.

It is a further object of the present invention to provide a sequence switching control in which the sequence of operation of the individual heating elements is periodically changed so as to modify the work cycle of the individual heating elements, the timing and degree of such change of sequence being readily adapted to the operating characteristics and requirements of a given work system.

To these ends the present invention provides a sequence changing system interposed between the sequence control and the load elements to periodically change the operating sequence of the load elements. The sequence changing system is capable of operating in at least two stages and is effective when in either of these stages to connect the sequence control to the load elements in first and second different sequences. Additional control means are provided for causing the sequence changing system to periodically shift from one stage to another.

The sequence changing device may, in one embodiment, comprise a plurality of switch elements which are simultaneously operated between its first and second stages in response to control signals received thereby from a control system. The control signals are preferably such as to cause the sequence changing switch elements to shift between the two stages at predetermined time intervals.

As a result of the changing of the operating sequences, the duty cycles of the individual heating elements are substantially varied, thus reducing the rate of failure of the heating elements to a substantial degree.

In another embodiment of this invention, the sequence changing device may be operated in at least four stages so that it is effective to operate the load elements in four different sequences, thereby further tending to equalize the overall duty cycle of each individual heating load element. As here specifically disclosed, in this embodiment, the sequence changing system comprises two simultaneously operated switches each of which is capable of being operated in either of two stages upon receipt of the timed control signals. The combination of these switches is effective to cause the heating elements to be connected to the sequencing control system in four different operating sequences, one after the other. It will be appreciated that by providing additional switch devices, each of which may be operated in two stages by the control signals, the number of variations of the operation of the load elements can be further increased by factors of two, that is, if three switching stages were provided, there would be eight different successive sequences for operating the load elements.

In a preferred embodiment of this invention, the control signals are provided by a timing motor which is effective to produce timing control signals, preferably of substantially equal time duration.

In accordance with the above, and to such other objects as may hereinafter appear, the present invention relates to a sequence changing system and to its manner of use in a heating control system, as defined in the appended claims and as described in this specification, taken together with the accompanying drawings in which:

FIG. 1 is a block diagram of a water temperature heating and control system embodying features of the present invention;

FIG. 2 is a schematic wiring diagram illustrating in an exemplary detailed form the sequence switches, sequence changer and heating elements of the system of FIG. 1;

FIGS. 3A–3D are graphical representations illustrating characteristics of a heating system without sequence changing; FIG. 3A showing the relative "on" times of the heating elements as normally operated; FIG. 3B showing the relative frequency of switching of such heating elements; FIG. 3C being a composite representation of the overall work cycle of the load elements in a typical prior art heating system, weighting equally the information of FIGS. 3A and 3B; and FIG. 3D being a graphical representation similar to that of FIG. 3C, but with greater weight being given to the information of FIG. 3A than that of FIG. 3B;

FIGS. 4A–4E are composite graphs similar to FIG. 3C illustrating the improved overall work cycle achieved by changing the sequence of operation of the load elements in accordance with the present invention, the curves being shown for various sequence changes;

FIG. 5A is a schematic diagram of a second embodiment of a sequence changer according to this invention;

FIG. 5B is a switching logic diagram representing the stages of the sequence changing switches of the embodiment of FIG. 5A;

FIG. 6A is a wiring diagram illustrating the manner in which the sequence changing switches of the embodiment of FIG. 5A are connected into a control system, to provide adidtional changes in the operating sequences of the load elements; and FIG. 6B is a logic diagram representing the four different operating sequences of the load elements achieved by the circuit of FIG. 6A.

The system shown in block diagram form in FIG. 1 illustrates the use of the present invention in an otherwise conventional boiler control system in which the temperature of the water in the boiler is established by the actuation of selected ones of a plurality of heating elements generally designated as 11. It will be understood that the present invention is equally applicable to the controlled operation of other work elements such as those capable of cooling and establishing desired conditions of pressure, velocity, and the like. Accordingly while the present specification speaks in terms of a heating system, this is merely for purposes of illustration and it will be understood that this invention may apply generally to the control of other load parameters as well.

In a conventional boiler heating system, the heating elements are sequentially actuated in response to the controlled closing of a series of step operated sequence switches designated as 12, which function in response to a command signal 14 from a step motor 26 (FIG. 2). The step motor 26 operates in response to a control signal derived by comparing the water temperature of the water system 16 represented by a signal at feedback path 18, connected to a balanced relay circuit 20. Balanced relay circuit 20 also receives a signal representative of the position of the sequence switches 12 via feedback path 22, and also receives an input signal at 24 corresponding to the desired boiler temperature.

The various input and feedback control signals applied to balanced relay circuit 20 are compared therein to produce the motor command signal 14. Command signal 14 is effective to position the sequence switches 12 so as to actuate a predetermined number of heating elements 11 in sequential order. The heating elements 11 are usually controlled by magnetic contactors (not shown) whose coils are controlled by the operation of the sequence switches 12.

The number of heating elements 11 which are operated or actuated is dependent upon the desired water temperature of the water system 16. Thus, sequence switches 12 will cause the energization of a selected number of heating elements 11 to cause the temperature of water system 16 to be at a temperature corresponding to the mechanical set point signal 24. In conventional discrete step boiler control systems, the sequence or order of operation of the individual heating elements 11 is always the same, that is the same heating elements are always the first to be energized followed by the sequential operation of the succeeding load elements. Thus in FIG. 2 there are ten electrical heating elements, designated 1–10 respectively, which are sequentially respectively opened and closed by the operation of the sequence switches 12a–12j (which are in turn opened and closed by step motor 26). The boiler control system thus far described is conventional and as such, forms no part of the present invention.

When step motor 26 is moved to its next step position to correct for deviation in the boiler temperature, one switch element of sequence switch 12 is either opened or closed to either actuate or deactuate the particular heating element 11 with which that switch element is in electrical connection.

For low heat supply, only the earlier heating elements, e.g., heating elements 1–5, will be energized and will remain energized at substantially all normal levels of boiler heating. The succeeding heating elements 6–10 will be energized in sequential order only as the boiler heating requirements are increased. Thus, in normal heating operations, the earlier heating elements will be the ones which are continuously energized, while the later heating elements will be energized only for increased load condition requirements or to correct for downward deviations from the desired boiler temperature. Accordingly, heating elements 9 and 10 will be energized only for full load conditions and thus will be rarely operated during normal boiler operation. Assuming that normal temperature conditions require only the utilization of heating elements 1–5, any variations in the boiler temperature may well be compensated for by the selective operation only of those heating elements in the middle of the operating sequence. Thus, if the boiler temperature falls below the desired temperature, an additional heater element will be energized by moving step motor 26 one step forward, to cause the operation of an additional heating element. Conversely, when the sensed water temperature rises above the desired temperature, the step motor 26 will be caused to move one step backwards to open one of the previously closed switch contacts of sequence switches 12 to deenergize a previously energized heating element. In either case, at normal load levels, the heating elements effective in maintaining the preset boiler temperature are generally those elements in the middle portion of the heating element operating sequence, that is, heating elements 4–6.

FIGS. 3A and 3B depict typical duty cycle and switching cycle graphs of conventional heating control system utilizing ten heating elements which are sequentially operated to establish the desired boiler temperature. FIG. 3A represents graphically the on-time of the individual heating elements, the ordinate of the graph representing relative magnitude fo the on-time for each heating element represented by its numeral along the abscissa. Thus the earlier operated heating elements 1, 2, and 3 are seen to be utilized for a relatively greater period of time than the later heating elements 8, 9, and 10, the relative period of on-time decreasing with the increasing order of operation of the respective heating elements. FIG. 3B is a graph of the frequency of switching operation for the switch contacts associated with each of the elements of an exemplary system as indicated in the ordinate of FIG. 3B, the abscissa once again identifying the individual heating elements in their order of operation. It will be seen that the switch contacts associated with the middle heating elements 5 and 6 are operated at a far greater frequency than the switch contacts associated with both the early switching elements 1–4 and the late switching elements 7–10. FIG. 3C is a composite of the graphs of FIGS. 3A and 3B showing the composite work cycle of the individual heating elements, equal weight being given to both the on-time and to the frequency of the switching operation of the heating elements, and is pertinent to those systems where, because of current magnitude or phase at the time of contact making or breaking, the frequency with which a switch is opened or closed tends to directly and significantly affect its useful life. FIG. 3C, therefore illustrates the relative work cycle of the various heating elements under such conditions. Thus, the middle heating elements 4–6 have the greatest work cycles and the late heating elements 8, 9, and 10 have the lowest work cycles. The early heating elements 1–3 have work cycles greater than the late elements but somewhat less than the middle elements, the last heating elements 10 having the least work cycle. FIG. 3D is a graph similar to that of FIG. 3C in which, however, the on-time of the work element has been weighted by a factor of 2.5 over the switching frequency, thus being more generally representative of most systems, in which the relative period of use is more determinative of heater element reliability than the frequency of switching of the associated contacts. The resulting work cycle curve produced in this manner indicates a slightly more equal distribution of use for the early and middle elements 1–6, but once again illustrates the relatively minor utilization of the later heating elements 7–10. In fact, the overall use of heating element 10 in FIG. 3C, the least used of the individual elements, is seen to be approximately 70% less than the average value of heating element use. As a result of this unequal utilization of heating elements, the likelihood of failure is greatest for those heating elements in the early and the middle of the operating sequence, i.e. elements 1–6, and least for the later operated elements. The unequal distribution of use and the corresponding increased likelihood of failure of the individual heating elements causes an overall increase in the likelihood of failure of the overall heating system.

Therefore, in accordance with the present invention, a sequence changer, identified as 28 in FIG. 1, is operatively interposed between the sequence switches 12 and the heating elements 11. The switch elements of the sequence changer 28 may be operated in one or another of at least two distinct stages to bring about alternating sequential operation of the heating elements.

One embodiment of a sequence changer 28 of the present invention is illustrated in FIG. 2 as comprising a plurality of simultaneously actuated switches 31–40 each being moveable, upon the actuation of the relay coil 30, into one of two stages designated respectively by $a$ and $b$.

As will become evident, the sequence changer 28 as illustrated in FIG. 2, is effective to operate the heating elements 1–10, in first the normal order of operation and then the reverse operational sequence. If the heating elements are thus operated in each operating sequence for a substantially equal period of time, the heating elements operated at the early and late stages of normal operation will be utilized overall for substantially equal time periods, thereby providing for optimum reliability of the heating system.

To this effect, switch contacts 31–40 are connected through leads 14a–14j to sequence switches 12a–12j respectively. The switch contacts 31a–40a are connected directly to heating elements 1 through 10 respectively, while switch contacts 31b–40b are connected respectively to heating elements 10 through 1, that is in the reverse order to the connection between switch contacts 31a–40a and the heating elements. It will be appreciated that the connection of switch contacts 31b–40b to the heating elements is not necessarily in the reverse order as compared to the connection of switch contacts 31a–40b, but that any desired change in the order of that connection may be effected depending upon the operative results desired. That is, switch contacts 31b–40b may, for example, be connected to heating elements 11 in the order 6, 7, 8, 9, 10, 1, 2, 3, 4, 5, respectively, or in any other desired order.

An energizing control signal is periodically applied to relay coil 30 upon the closing of a switch 42, mechanically operatively coupled to a timing motor 44. Timing motor 44 may be set to operate switch 42 at any desired time interval thereby to energize and deenergize relay coil 30 in corresponding intervals. The energization of relay coil 30 will produce a corresponding variation in the position of switch contacts 31–40 between its respective a and b stages. It has been found advantageous in an exemplary boiler heating control system to design timing motor 44 to energize and de-energize relay coil 30 at equal intervals of approximately three and a half days, that is, during a one week period, each of the sequence changing switches 31–40 will be in one of its stages for a period of three and a half days and in the other of its stages for a similar period. It will be understood, however, that the time sequence may vary widely as to duration and equality of time for each stage depending upon the operative results desired.

The operation and manner of use of the sequence changer 23 is now apparent. In one stage of the sequence changing switches 31–40, as determined by the energization or de-energization of relay coil 30, which in turn is effected by the control signals produced by timing motor 44, certain of the heating elements 1–10 will be energized in a first sequence, depending upon the operation of the sequence switches 12. The number of closed sequence switches are, as described above, determined by the boiler temperature condition. When after the expiration of the predetermined interval, the control signal from timing motor 44 changes so as to change the energization condition of coil 30, the sequence changing switches 31–40 will move to the other stage, that is, from a to b or from b to a. The changeover of the contacts of switches 31–40 is effective to connect the heating elements to the sequence switches 12 in a different order or sequence which, in the embodiment of FIG. 2, is a reversal of the original order. Thus, the order of operation of the heating elements is also changed. For example, assuming that sequence switches 12a–12d alone have been closed by the operation of step motor 26, heating elements 1–4 will be energized when switch contacts 31–40 are in their "a" stage. When the sequence changing switches 31–40 are moved to the "b" stage in response to a new control signal from timing motor 44, heating elements 7, 8, 9, and 10 will be operatively connected to and sequentially operated in response to the same sequence switches 12a–12d. Thus, periodically the heating elements 1–10 are operated in different reverse sequences so as to tend to equalize the on-time or duty cycle of the individual heating elements, while maintaining the desired operation of the boiler system.

The improved results derived by the interposition of sequence changer 28 between the heating elements 11 and the sequence switches 12 can be readily appreciated by comparing the graphs of FIGS. 4A–4E with the graphs of FIGS. 3A–D. For example, FIG. 4A is a graphical representation similar to FIG. 3C of the total use or work cycle of the heating elements, the relative on-time and switching frequency being equally weighted, when the heating elements 11 are operated first in the normal sequence of 1–10 and then in a second sequence wherein the heating elements 1–10 are operated in the order of 5, 6, 7, 8, 9, 10, 1, 2, 3, 4. That is, the second operating sequence begins with the operation of heating element 5, then proceeds in successive steps to heating element 10, and then to the operation of heating elements 1–4.

FIG. 4B illustrates in graphical form the combined work cycle of the individual heating elements in a two sequence operation, the sequences being first the normal operating sequence 1–10, followed by an operating sequence in the order of 3, 2, 1, 10, 9, 8, 7, 6, 5, 4.

FIG. 4C is an overall total work cycle graph illustrating the operation of the heating elements first in the normal sequence, and then at an operating sequence of 6, 7, 8, 9, 10, 1, 2, 3, 4, 5.

FIG. 4D is a similar graph representing the overall work cycle of the heating elements when they are operated first in a normal operating sequence 1–10 and then in a reverse operating sequence 10–1 as achieved by the circuit of FIG. 2, with equal weight being given to both time and frequency of switching; and FIG. 4E illustrates the overall use curves for the two operating sequences shown in FIG. 4D, with the on-time factor being weighted by a factor of 2.5 with respect to the switching frequency factor. In all the situations graphically illustrated in FIGS. 4A–E, the heating elements operate at the two sequences illustrated for substantially equal periods of time.

It will be seen that in each of the graphs of FIGS. 4A–4E, the overall average use or work cycle of each of the heating elements is substantially equalized as a result of the periodic change in the sequence of their operation. This is clearly seen by comparing the graphs of FIGS. 4A–E with the corresponding graphs for only normal sequential operation of the heating elements as in FIG. 3C. Comparing the results of FIG. 4D to FIG. 3C, which illustrate comparable operation for one sequence and two sequences, the maximum deviation for use of one heating element from the average use of an element for two sequence operation is 50%, as compared to a maximum deviation of 80% in the single sequence operation (FIG. 3C). Similarly, comparing the weighted curves of FIGS. 3D and 4E, it is observed that the maximum deviation from average use in the two sequence operation is approximately 28½%, (FIG. 4D) as compared to 70% in the single sequence of heater element operation (FIG. 3D).

Thus, in each of the graphs illustrating two sequence operation of the heating elements, in accordance with this invention, the equalization of the duty cycle, frequency of the switching, and the combined work cycle for all the heating elements is significantly improved over the normal single sequential operation of the heating elements.

The sequence changer 28 of FIG. 2 will establish only a single variation in the sequence of operation of the respective heating elements 11. A modification of the sequence changer, shown in FIGS. 5A and 6A, is capable of establishing four separate sequences of heating element operation in response to control signals derived from a timing motor.

As shown in FIG. 5A, timing motor 44 is again operatively connected to switch 42, which, in this embodiment, is in series circuit relationship with a step relay 46. Step relay 46 is operatively connected to a switch 48 which in turn is in series relationship with a second step relay 50 and with a multiple contact switch $R_1$. Step relay 50 is operatively connected to a switch 52 which is in series relationship with a multiple contact switch $R_2$. The contact of switches $R_1$ and $R_2$ are all simultaneously operated upon the suitable operation of the associated relay operated switches, 48 and 52 respectively.

Step relays 46 and 50 have the characteristic that their associated relay operated switches 48 and 52 change their status from closed to open or vice versa each time that the relays 46 or 50 become energized after being deenergized. Thus, in the embodiment of FIG. 5A, when timing motor 44 closes switch 42, the coil of step relay 46 will be energized to cause the closing of relay operated switch 48. The closing of switch 48 will energize the coil of step relay 50, thus closing switch 52. As a result of the closing of switches 48 and 52, the switches $R_1$ and $R_2$ (shown more specifically in FIG. 6A), are closed.

When timing motor 44 opens switch 42, the coil of step relay 46 will be deenergized, but there will be no change in switch 48, and no change in switch 52. Both switches $R_1$ and $R_2$ will remain closed. When timing motor 44 again closes switch 42, the coil of step relay 46 is once again energized thereby to open relay switch 48, thus opening the contacts of switch $R_1$. Since step relay 50 receives no control signal, its coil is deenergized but the condition of switch 52 remains unchanged. That is, switch 52 and the contacts of switch $R_2$ remain closed.

When timing motor 44 next opens switch 42, there is no change in switches 48, 52, $R_1$ and $R_2$.

When timing motor 44 next closes switch 42, step relay 46 is once again energized, thus closing switch 48 and applying a control signal to step relay 50, which will cause the latter to be once again energized, thereby to cause relay switch 52 to open. As a result, the contacts of switch $R_1$ are closed, and the contacts of switch $R_2$ are now opened. When timing motor 44 next closes switch 42 after having first opened it, step relay 46 is energized again, thereby to open relay switch 48. Step relay 50 is once again deenergized and thus relay switch 52 and switch $R_2$ remain open.

This operating sequence is shown in a logic chart in FIG. 5B, in which successive timing control signal "0-4", representing successive closings of switch 42 by timing motor 44, are shown in the left hand column. Prior to the receipt of the first timing control signal, i.e. at timing control signal "0," the contacts of switches $R_1$ and $R_2$ are in their open or O stages. The first timing control signal "1" energizes the coils of step relays 46 and 50 thereby closing the contacts of switches $R_1$ and $R_2$ into their X position. Similarly, the succeeding timing control signals "2," "3," and "4" produce the logic or stage condition of switches $R_1$ and $R_2$ as shown in FIG. 6B. Thus, the second received control signal "2," causes the contacts of switch $R_1$ to be all open while the contacts of switch $R_2$ are all closed.

Upon the receipt of the third control signal "3," the contacts of switch $R_1$ are closed and the contacts of switch $R_2$ are opened, and upon the receipt of the fourth control signal "4," the contacts of switches $R_1$ and $R_2$ are opened. Upon receipt of the next control signal, the condition of switches $R_1$ and $R_2$ will return to the logic condition similar to the situation when the first timing signal "1" is applied, that is, switches $R_1$ and $R_2$ are both closed and the sequence changing operation starts over again.

FIG. 6A illustrates the manner in which the contacts of the switches $R_1$ and $R_2$ are interconnected to provide the plurality of sequences at which the load heading elements may be operated in response to sequence control signals received from the sequence switches 12 and timing motor 44. For simplicity of description, the system of FIG. 6A is shown as comprising only four heating elements 1-4 to which the contacts 61, 62, 63, and 64 of switch $R_2$ are respectively connected. Similarly, the contacts 71-74 of switch $R_1$ are respectively coupled to the four step operated sequence switches corresponding to sequence switches 12a-12d in the embodiment of FIG. 2.

In FIG. 6A the contacts 71-74 of switches $R_1$ and $R_2$ are shown in the opened or O stage, corresponding to the condition of FIG. 5B in which a timing control signal has not yet been received, or in which the fourth control signal, "4," is received.

The contacts of switches $R_1$ and $R_2$ are each movable between the open position at $a$ to the closed position at $b$, so that there are four possible overall transfer paths for the signals applied to the contacts 71-74 of switch $R_1$ from the sequence switches 12a-d to the heating elements. Thus, the operating sequence for the heating elements 1-4 depends upon the condition or stage of the contacts of switches $R_1$ and $R_2$. As shown in FIG. 6B, when the contacts of switches $R_1$ and $R_2$ are in the OO condition, the sequence of operation of the heating elements is the normal 1, 2, 3, 4, sequence. Upon the receipt of the first control signal from timing motor 44, switches $R_1$ and $R_2$ will both be closed resulting in the XX stage, in which contacts 71-74 and contacts 61-64 will be in their $b$ position. This will effect a sequence of operation of the heating elements 1-4, in the order of 4, 1, 2 and 3. Upon the receipt of the next control signal, contacts 61-64 of switch $R_1$ will all open and switch $R_2$ will remain in the closed position resulting in the OX logic stage, in which the sequence of operation of the heating elements is 3, 4, 1, and 2. The next control signal causes the contacts of switch $R_1$ to be closed to their $b$ position, thereby causing the contacts of switch $R_2$ to be opened to their "$a$" position, resulting in the XO logic condition in FIG. 6B, in which yet another sequence of operation—2, 3, 4, 1—of the heating elements is achieved. The following control signal returns switches $R_1$ and $R_2$ to their opened or "$a$" positions shown in FIG. 6A, in which the normal sequential operating sequence 1, 2, 3, 4 of the heating elements once again obtains.

It will be apparent that if further variations in the sequence of operation of the heating elements are desired, an additional step relay may be placed in parallel with the two step relays shown in the embodiment of FIG. 5A, having associated switches interconnected in series with switches $R_1$ and $R_2$ of FIG. 6A. With the proper interconnections of the leads therebetween, there will then be eight possible variations in the operating sequence of the heating elements. By providing switches capable of being established in more than two positions, in the proper circuit arrangement, any desired number of sequence variations may be achieved. The greater number of variations of the order of operation of the heating elements during a given period will result in a greater equalization of the utilization of the individual heating elements, although it is believed that four sequence variations, as provided by the embodiment of FIGS. 5A and 6A, will be adequate under virtually all conditions to achieve the desired improved results of the present invention.

The present invention, therefore, has described a control system for establishing and controlling the temperature of a water system such as a boiler or the like, in which the period to utilization of the individual heating elements, the frequency of switching of the individual heating elements and other operating conditions, weighted as desired, can readily be compensated for. This is to be contrasted with the known systems wherein only a single sequence of work element operation is permitted, resulting in disproportionate periods of use of certain of the heating elements, while the remaining elements remain substantially inoperative for most of the period of system operation. As a result, the average use or weighted work cycle of each of the heating elements can be substantially equalized, thus reducing the possibility of failure of the individual heating elements and producing greater reliability of the overall system. This is achieved by the use of relatively inexpensive and reliable switching equipment, which can be readily incorporated into existing systems with a minimum amount of system disruption and cost of installation.

It will be understood that the embodiments described above have been disclosed merely for purposes of illustration, and that many variations may be made without departing from the spirit and scope of the invention as defined in the following claims.

I claim:

1. A control system comprising a plurality of load elements adapted to be selectively actuated, first control means operatively connected to said load elements and normally effective to cause the selective actuation of said load elements in a predetermind sequence, sequence changing means operatively interposed between said first control means and said load elements capable of operating in first and second stages and effective when in either of said stages to connect said first control means to said load elements in first and second different sequences respectively, and second control means operatively connected to said sequence changing means and effective to cause said sequence changing means to operate first in one and then in the other of said stages.

2. The control system of claim 1, in which said load elements are actuated upon the receipt thereby of an electrical signal, said sequence changing means defining means for operatively electrically connecting selected ones of said load elements and said first control means.

3. The control system of claim 2 in which said second control means comprises means for producing a plurality of control signals.

4. The control system of claim 3 in which said sequence changing means comprises a plurality of switch means movable between first and second stages in operative response to said control signals.

5. The control system of claim 4 in which said second control means comprises stage selecting means operatively connected to said signal producing means and to said plurality of switch means.

6. The control system of claim 5 in which said stage selecting means comprises relay means, said signal producing means comprising an assembly including a timing motor effective to produce a series of such control signals in predetermined time intervals.

7. The control system of claim 1 in which said second means comprises means for producing a plurality of control signals.

8. The control system of claim 7 in which said signal producing means is effective to produce a series of such control signals at predetermined time intervals.

9. The control system of claim 8 in which said control signals are produced by said signal producing means at substantially equal time intervals.

10. The control system of claim 1 in which said second control means is effective to produce a plurality of control signals and said sequence changing means is capable of operating in at least three stages in each of which it is effective to connect said first control means to said load elements in a different sequence, said second control means being effective to cause said sequence changing means to shift from one stage to another through said at least three stages as said control signals are received thereby.

11. The control system of claim 10 in which said plurality of load elements are each actuated by having an electrical signal applied thereto.

12. The control system of claim 10 in which said control signals are produced at substantially equally spaced timed intervals.

13. The control system of claim 11 in which said second control means comprises a source of timing signals, said timing signals defining said control signals.

14. The control system of claim 13 in which said sequence changing means comprises first and second sequence switching elements operatively connected to said source of timing signals, said first and second sequence switching elements each being operable in first and second tages, said first and second sequence switching elements being operatively connected to one another in a manner such that said sequence changing means is operable in said at least three stages, in response to said timing signals.

15. The control system of claim 14 in which said first and second sequence elements are connected in series with one another between said first control means and said load elements.

16. The control system of claim 15 in which said first and second sequence switching elements each comprise stepping means alternately operable in a first and a second stage as said timing signals are received thereby, and a plurality of simultaneously operable contacts respectively operatively connected to said stepping means.

17. The control system of claim 16 in which said stepping means comprises first and second stepping relays in effective parallel circuit connection with one another, one of said stepping relays being in effective series circuit relation with said source of timing signals.

18. The control system of claim 1, in which said second control means comprises timing means operatively connected to means for producing control signals, whereby said signals are produced in timed sequence as determined by said timing means.

References Cited

UNITED STATES PATENTS

| | | | |
|---|---|---|---|
| 2,675,456 | 4/1954 | Clemanson et al. | 219—486 |
| 3,161,758 | 12/1964 | Biermann et al. | 219—480 |
| 3,052,788 | 9/1962 | Peters | 219—480 |
| 3,031,559 | 4/1962 | Harmon et al. | 219—321 X |

BERNARD A. GILHEANY, Primary Examiner

F. E. BELL, Assistant Examiner

U.S. Cl. X.R.

219—234, 321, 334, 493; 307—38